July 17, 1923.
E. W. JONES ET AL
METHOD OF MAKING PHONOGRAPHIC RECORDS
Filed June 3, 1916   3 Sheets-Sheet 1
1,461,849
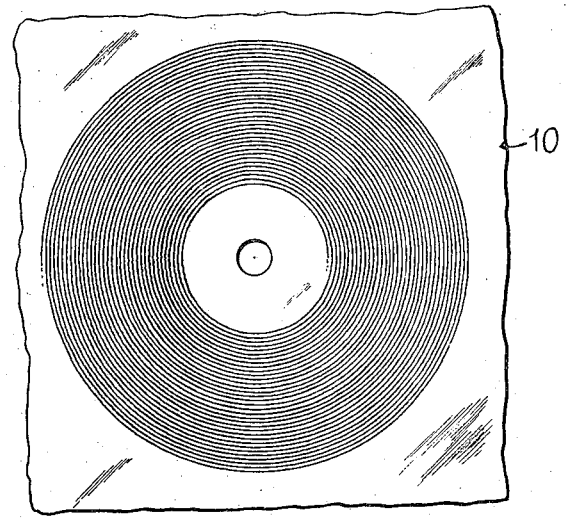
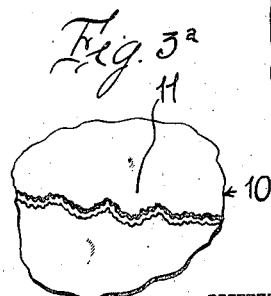
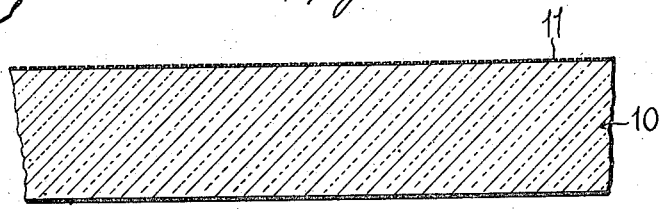
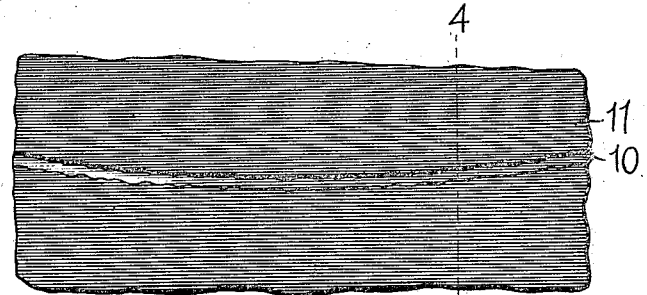
Inventors
EARLE W. JONES
+ EDWARD R. HARRIS
By Frederic B. Wright
Attorney July 17, 1923.

E. W. JONES ET AL 1,461,849

METHOD OF MAKING PHONOGRAPHIC RECORDS

Filed June 3, 1916    3 Sheets-Sheet 2

Inventors
EARLE W. JONES
EDWARD R. HARRIS
By Frederic B. Wright
Attorney

July 17, 1923.
E. W. JONES ET AL
1,461,849
METHOD OF MAKING PHONOGRAPHIC RECORDS
Filed June 3, 1916  3 Sheets-Sheet 3
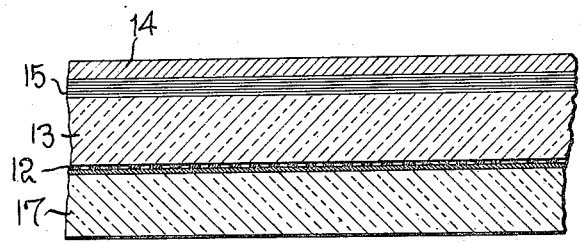
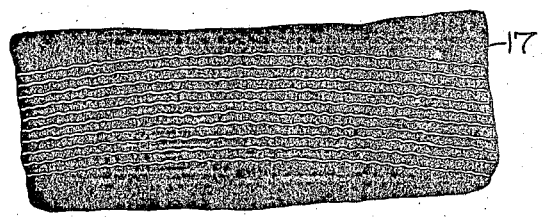
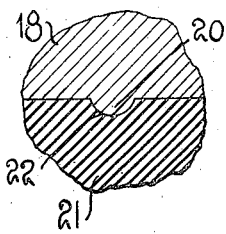
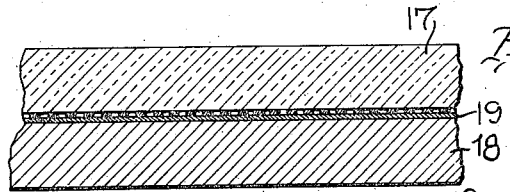
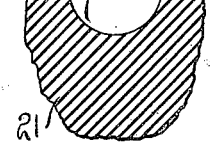
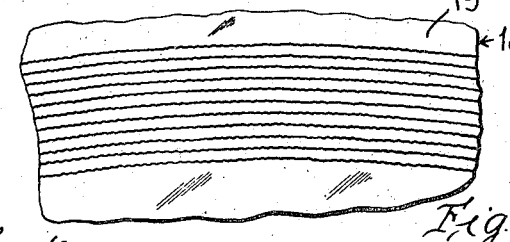
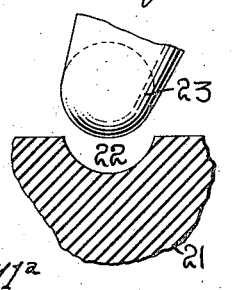
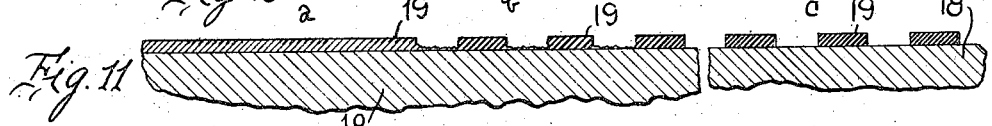
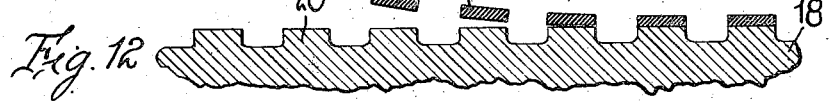
Inventors
EARLE W. JONES
& EDWARD R. HARRIS
By Frederic B. Wright
Attorney Patented July 17, 1923.

1,461,849

UNITED STATES PATENT OFFICE.

EARLE W. JONES, OF NEW YORK, N. Y., AND EDWARD R. HARRIS, OF ARLINGTON, NEW JERSEY.

METHOD OF MAKING PHONOGRAPHIC RECORDS.

Application filed June 3, 1916. Serial No. 101,548.

*To all whom it may concern:*

Be it known that we, EARLE W. JONES, a citizen of the United States, residing at New York city, in the county of New York and State of New York, and EDWARD R. HARRIS, a subject of the King of England, residing at Arlington, in the county of Hudson and State of New Jersey, have invented certain new and useful Improvements in Methods of Making Phonographic Records, of which the following is a specification.

This invention relates to the art of recording and reproducing sound waves, and particularly to methods of manufacturing an original or master phonautogram and manufacturing dies therefrom which may be used for the stamping out of commercial record tablets.

The commercial record tablets as manufactured to-day are of two kinds, those wherein the reflex of the sound waves is perpendicular to the face of the plate and those wherein the reflex or irregularities corresponding to sound vibrations are parallel to the face of the plate and formed by lateral undulations of the record groove. This invention does not relate to "up and down" recording but to the formation of laterally undulatory record grooves.

The present and most approved method of making laterally undulatory sound record grooves consists in cutting a record groove originally in a wax tablet, this groove under present methods having a depth of approximately .005 of an inch and a width of approximately .005, there being ordinarily less than one hundred lines or grooves to the inch. After this "master record" is made, the face of the wax disk and the face of the record groove are carefully dusted with fine plumbago and electroplated to produce a matrix having thereon a raised spiral corresponding to the record groove. The master matrix so made, after being backed, is used as a die to produce a number of wax tablets having record grooves impressed therein, and from these in turn are produced electroplated "dubbed" matrices which are then employed as dies and used to impress the records in tablets of a composition resembling hard rubber, these last-named tablets being the final commercial records.

Another process which is not generally used to-day is to trace a phonautogram upon the surface of a plate of zinc covered with a thin coating of soapy or waxy substance, the stylus of the recording machine removing the waxy substance from the plate and then etching the zinc plate to produce a record groove therein. The etched disk is then cleaned and electroplated, and the inverse matrix formed of copper, after being stripped and backed, is used as a die from which to produce either "dubbed" matrices or record tablets or compositions as above described. This last-named process is objectionable particularly in two respects. The etching acid undercuts the lateral walls of the grooves and the bottom of the record groove is rendered rough and uneven by the action of the acid, these irregularities on the bottom of the groove being reproduced on the bottom of the groove in the composition record tablet causing adventitious noises on reproduction and irregularly wearing away the reproducing stylus. The other particular objection to this process is that it is impossible to get a smooth and polished matrix by electroplating the regular zinc plate, and a further objection is to the cost and time involved in the etching and electroplating operations.

The first process referred to is also open to many objections. Here too the electroplating operation is relatively costly and time-consuming, and here too the electroplated reproduction does not give a smooth and polished matrix. Nevertheless, this first referred to method or process is preferred to the process last-referred to. The first process, however, is open to a very vital objection. The record groove of the master record is cut in wax, and the necessity of cutting this groove in wax places the manufacturer between the horns of a dilemma. If the cut made by the recording stylus is too shallow the recording stylus and the reproducing stylus will not track properly. On the other hand, the deeper the cut the more difficult it is to make because the cutter or recording stylus is plowing or cutting through a material which is highly resistant relative to the power actuating the stylus and causing its lateral vibrations. The vibration of the air within the sound box is relatively weak and the vibrations are very delicate and very rapid. The stylus has to overcome the resistance of the wax to its further progress as well as the resistance of the wax to further cut. The deeper the stylus cuts the wax the greater will be this resistance of the wax, and this resistance increases in direct proportion to the square of the depth of cut.

Again, as the stylus is a lever pivoted intermediate its ends, the lower end of the stylus moves in an arc or would so move were the sound box rigidly supported. As the sound box or recording head is not rigidly supported the recording head or sound box rises and falls to compensate for the arcuate cut made by the recording stylus, and as the vibrations of the stylus become rapid the recording head cannot drop down quickly enough and the bottom of the record groove is rendered uneven and rough. The record groove in ordinary commercial records has only approximately an even depth, and where measurements of thousandths of an inch are important it is obvious that approximate evenness is imperfect which will result in imperfect sound production. Furthermore, actual practice and microscopic examination has demonstrated without question that the laterally undulatory record groove cut in wax does not have a constant width but that the groove constantly varies in width, this being partly due to the oscillation of the recording stylus through relatively hard material, partly due also to the fact that the point of the stylus or cutter moves in an arc as before described, and also partly due to the various densities of the wax itself, it being obvious that it is impossible to secure an absolutely uniform density throughout the whole surface of the wax tablet upon which the record is being made.

Again, the form of groove as cut in the wax is objectionable in many ways. The particular objections to the particular form of record groove commonly found in commercial records of the laterally undulatory type are brought out more specifically in a co-pending application filed by us, of even date herewith, on a sound record. But one of these objections may be adverted to here, namely, that the record groove because of its approximate V-shape in cross section is relatively wide at the surface of the record tablet about .005 and that therefore only about one hundred convolutions of the record groove can be produced in a space of one inch. This of course materially limits the length of the record which may be placed upon any tablet.

One object of our invention is generally to provide an improved process or method of making phonographic records which will do away with many of the objections above referred to and which will further cheapen the cost of producing record tablets and materially expedite their manufacture.

A further object is to provide a method whereby record tablets may be formed having as high as three hundred convolutions or grooves to the inch.

Still another object is to provide for making a very shallow record groove thereby reducing materially unnecessary friction between the reproducting stylus and the face of the groove, said shallow grooves, however, having such form that they will securely engage the reproducing stylus and hold it to its track.

A further object of the invention is to do away with the necessity of electroplating in order to produce matrices and thus do away with the attendant expense both of time and money.

Still another object is to provide means whereby matrices may be quickly and cheaply made, these matrices having a highly polished surface both as regards the face of the matrix and the face of the groove to thus eliminate the roughnesses and irregularities which interfere with the proper sound reproduction and which superpose upon the original sound intended to be reproduced a secondary series of noises caused by the grinding action of the stylus with the record.

A further object is to provide a method of producing sound records which will do away entirely with the cutting of the record in a wax tablet and which will permit the recording stylus to vibrate perfectly freely and without impediment.

Still another object is to provide for making record grooves having absolutely constant width and of absolutely even depth.

Another object is to provide a method which will secure a greater degree of delicate accuracy in the recording of sounds and in the reproduction of sounds, and in this connection to do away with the adventitious sounds or noises not intended to be recorded or reproduced by eliminating the step of cutting out a record groove in wax with the attendant irregularities of the cutting action and still further do away with these irregularities and unevennesses by eliminating the step of electroplating in order to form a matrix.

Other objects and advantages will appear in the course of the following description.

The various steps of our precess are illustrated in the accompanying drawings, wherein:

Figure 1 is a relatively small top plan view of the glass plate containing the master record in the form of a phonautogram traced thereon;

Figure 1ª shows the manner in which the recording stylus is set in cutting the master record, the view showing a section of the plate 10 and a face view of the recording head and stylus;

Figure 2 is a fragmentary section through the glass plate showing the film thereon after the phonautogram has been traced, the film being shown as relatively thick;

Figure 3 is an enlarged face view of a portion of the plate with the film thereon and the phonautogram traced through the film;

Figure 4:
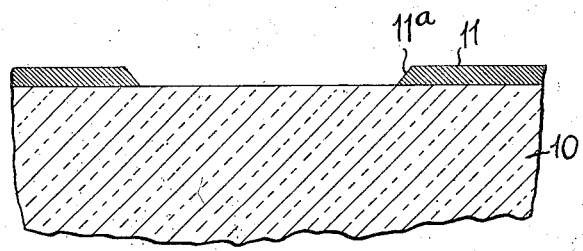
Figure 5:
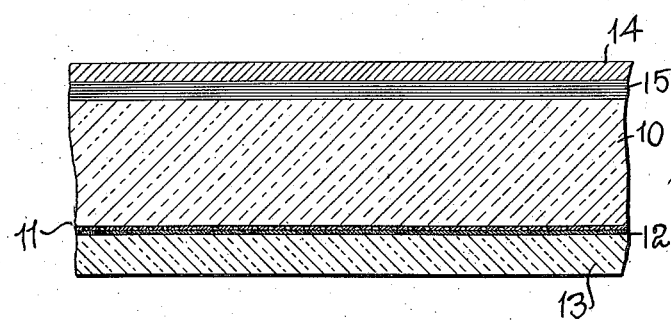
Figure 6:
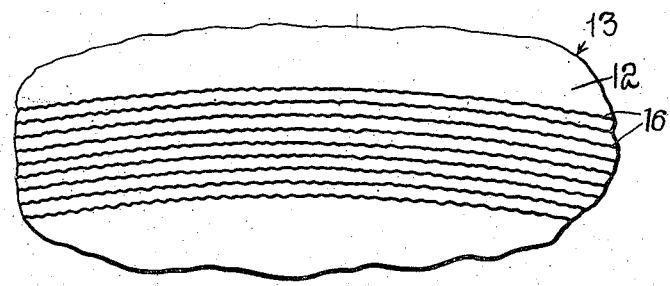

Figure 3ᵃ is a correspondingly magnified fragmentary face view of a phonautograph showing the minor irregularities formed by the "partials";

Figure 4 is a very greatly magnified, fragmentary section taken through the plate transverse to the direction of the phonautogram showing in an exaggerated manner the way in which the recording stylus cuts through the film;

Figure 5 is a section of the master record and its film, the sensitized plate against which the film is disposed and the ray filters which are used in printing the positive upon the sensitized plate;

Figure 6 is a face view of the sensitized plate 13 after it has been chemically treated, the phonautogram being indicated on the plate by black opaque lines;

Figure 7 is a sectional view of the plate shown in Figure 6 disposed against the second sensitized plate to form the "mother stencil" or second negative;

Figure 8 is a face view of the second negative or "mother stencil" after it has been chemically treated, showing the phonautogram in white lines upon a black opaque ground;

Figure 9 is a sectional view of a copper plate intended to form a die having thereon a sensitized film, the view showing in section the "mother stencil" disposed against the sensitized face of the copper plate;

Figure 10 is a face view of the copper plate after the phonautogram has been photographed thereon and the sensitized film has been chemically treated;

Figure 11 is a very greatly enlarged sectional view of the copper plate, the portion a of the plate showing the sensitized film on the copper plate after it has been chemically treated, the portion b showing the phonautographic lines of the sensitized film after they have been baked.

Figure 11ᵃ is a like view to Figure 11 but showing the copper plate after the film thereon has been baked and scrubbed and cleaned.

Figure 12 shows the copper plate after it has been etched and at the left hand shows the enamel, formed by baking the sensitized line or strip, as having been lifted;

Figure 13 shows the copper plate after it has received the second etching;

Figure 14 shows the complete die as it is used in impressing the record in a record tablet, the die and record tablet being in section;

Figure 15 is a fragmentary sectional view of the record tablet showing the exact form of the record groove as formed in the tablet;

Figure 16 is a sectional view of a record tablet showing the extremity of the reproducing stylus and showing the manner in which it engages within the record groove.

In carrying out this method a relatively thick plate of heavy crystal glass of great transparency and clearness is coated with an extremely thin film 11 of suitable material, this film being absolutely structureless and collodial and having a thickness which is practically inappreciable. To form this film, the plate 10 of glass is covered by flowing or other means with a coating 11, formed of a mixture of about 50 parts oxidized asphaltum, 45 parts Syrian asphaltum, and 5 parts of wax. Of these ingredients, the oxidized asphaltum is dissolved in a small quantity of chloroform, some turpentine is added thereto, and the chloroform is allowed to evaporate, so that there results liquified oxidized asphaltum. The Syrian asphaltum and the wax are separately dissolved in turpentine and then the three ingredients are mixed together to form the film 11. This film is extremely thin, is transparent, non-actinic when used with color screens, as heretofore described. The film is extremely smooth and without structure, and hardens without shrinkage or alteration. The film becomes, shortly after its application, quite hard, but at the same time it does not chip when cut through by a recording stylus. The glass plate which is designated 10 in Figs. 1, 2, 3 and 4, may be made of any desired shape but as illustrated is square and has a thickness of about one-third of an inch and an area equal to the area of the sound recording space of a phonographic record tablet. A phonautogram is traced through this film by a suitable cutting tool fixed to the sound box or recording head of a sound recording instrument in any well known manner so that the material of the film is removed to form a laterally undulatory line or phonautogram upon the glass. This film in one sense of the word is opaque. The film while translucent is either photographically opaque, or partially so, and in the latter case, in conjunction with certain color screens, as will be later described, becomes absolutely opaque to all actinic light. The constituents of such a film are described in our pending application.

The reason for using a film of this character is as follows: It has been proposed heretofore to use an opaque coating upon glass, in which coating or through which opaque coating the phonautogram is traced, but it is extremely difficult to secure a coating which, if the coating is very thin, will prevent the passage of rays of light. The thinner the coating the more translucent the coating is, and as a consequence relatively thick coatings or films have heretofore been used. We use an inappreciably thin coating or film which is so thin that it is translucent, but give this film a certain predetermined color, as for instance, a yellowish orange color, by using certain definite materials to form the film, which renders this film to a certain extent non-actinic, that is, photographically opaque, and then use in printing a positive from the negative so formed certain color screens as will hereafter appear. The color of the film is due partly to the necessity of using certain materials in making this film which will permit it to be absolutely structureless and be flowed upon the glass plate very thinly, and secondly, due to our desire to secure a photographically opaque or partially opaque film. The film 11 for a considerable time after it has been flowed upon the plate, is waxy in its character so that it offers practically no resistance to the free movement of the recording stylus or cutter $a$ (see Fig. 1$^a$). The stylus cuts through this film but the film is so inappreciably thin that there is practically no resistance to the cutting action of the stylus and naturally nowhere near such resistance as is found in cutting a relatively deep record groove in wax.

The recording stylus in all machines where the record groove is laterally undulatory vibrates laterally and is in essential respects a lever so that the cutting end of the recording stylus moves in more or less of an arc. In order to reduce the vertical arcuate movement of the cutting stylus as much as possible, the recording or cutting stylus $a$ as illustrated in Figure 1$^a$, is disposed at an angle to the face of the plate 10. It is thus obvious that the point of the stylus describes but an infinitesimally small vertical arc. For the greater portion of its stroke, therefore, the cutting stylus contacts firmly with the glass plate and cuts entirely through the film, but at opposite ends of its stroke the recording stylus rises to an infinitesimal degree and hence leaves, as shown in Figure 4, a margin 11$^a$ at the sides of the cut, which margin, as it may be termed, is slightly beveled. It will of course be understood that Figure 4 shows a very greatly exaggerated sectional view of the film and a very greatly exaggerated margin 12. A perfectly flat-faced cutting stylus is used and even though this is the case and even though the recording stylus extends at the angle shown, yet as the stylus is laterally vibrated and reaches the end of its stroke, but one of its corners will contact with the plate at a time at this point, leaving the thin beveled margin 12, this being particularly noticeable at the acute angles of powerful sound waves where the recording stylus is vibrated to a relatively great extent. It is furthermore to be noted with regard to this step, that the use of glass as a backing for the film is of considerable importance inasmuch as the surface of the glass which is highly polished, the glass being the very best crystal or plate glass, prevents any digging in of the stylus as would inevitably occur with wax, particularly where the stylus was inclined at the angle shown in Figure 1$^a$. The stylus, however, cannot dig into the surface of the glass but glides smoothly over the surface, the glass forming no impediment to the free movement of the stylus. It follows, therefore, that the margin of the phonautogram formed upon the plate 10 will have different translucencies, and if a photographic impression were made by ordinary light from the plate 10 after the phonautogram had been traced thereon, the lateral margins of the phonautographic line would be blurred or fuzzy which would materially interfere with securing an absolutely true etched reproduction and would prevent the walls of the record groove as eventually formed by the remainder of our process from being of absolutely constant width, which is particularly essential.

After the phonautogram has been cut in the film on the plate, the film is allowed to dry, which, because of its peculiar nature, it does without skrinking. The film eventually becomes very hard and may be used for the production of positives as will be later described, and this film may also be used at this stage for the production of a positive upon a sensitized sheet of copper, as will hereafter appear.

The first stage of the process as above described consisted in coating the glass plate with the film 11. The second step consisted in cutting the phonautogram through this film. The third step of the process is to use the glass plate 10 with the phonautogram thereon as a negative and print a positive upon a photographic glass plate having thereon a sensitized film. This third step is shown in Figure 5. In this case, that side of the glass plate 10 which carries the film 11 is placed against the photographically sensitized film 12 on a glass plate 13. The film of this glass plate 13 is specially prepared. In other words, this plate is what is known as a specially prepared "Kramer" dry plate, the grain of the film or sensitized coating being extremely fine. Light from any suitable source is now allowed to pass through certain ray filters or color screens designated 14 and 15 and through the glass 10 onto the sensitized surface of the dry plate 13. These ray filters are preferably colored respectively purple and blue so that where there is a trace of the orange colored film 11 no actinic light can possibly pass. These filters or screens, however, permit of the passage of the most chemically active actinic rays through the places where the film 11 has been cut away to form a phonautogram, the rays of light passing through the transparent line traced through the film 11 acting photographically upon the sensitized surface of the plate 13 in the well known manner. The color of the film 11 with the color screens 14 and 15 produces an absolutely ruby light wherever the light passes through both of the screens and throught the thinnest layer of the film 11.

It will be obvious that as the recording stylus oscillates, the cutting point of the stylus will swing in the arc of a circle and rise at the ends of the stroke. While this is counteracted by the fact that the recording head is vertically movable and, therefore, drops down, yet on very rapid vibrations of great amplitude, the recording head does not have time to drop down and hence the recording needle swings in the arc of a circle. This arc is very slight but, nevertheless it is present. Therefore, at opposite ends of the stroke, or at one end of the stroke, the needle will rise and thus leave a small margin in the corners of the line formed by said stroke, that is, at those portions of the line where the stylus, swinging in one direction, stops, and commences to swing back in the opposite direction.

Now by reference to Figure 4 it will be seen that the margins 11ª of the film, that is the corners formed in the record line where the stylus has ended the stroke in one direction and is about to return, contain a greater or less thickness of the orange colored photographically opaque film, and therefore the line which will be photographically made upon the sensitized surface of the plate 13 will be narrower than the line or phonautogram traced upon the surface of the plate 10 by the width of the margins 11ª of said line and the line will be clean cut and of an absolutely uniform width. These thin and slightly cut margins 11ª therefore are caused to act as part of the photographic opaque screen and the line developed upon the plate 13 is consequently not "fuzzy" or blurred. It will thus be seen that the color of the translucent film 11 is of importance and that the use of the color screens 14 and 15 is also of great importance.

After the plate 13 has been treated in the usual and well known manner, it forms a transparent plate with an absolutely black photographically opaque phonautogram 16 extending across its surface. What was before the cut or plowed volute, spiral, laterally undulatory track or record will now be densely black upon a ground of clear glass.

The fourth step in our process is as follows: The photographic positive made as above described is now placed with its sensitized and treated face in contact with another specially prepared photographic plate designated 17, as illustrated in Fig. 7, and the ray filters 14 and 15 again used so as to prevent the passage of any light except that which is particularly actinic. The light is passed through the plates and filters and the result, after proper treatment of the plate 17, is a white line negative, illustrated in Figure 8, in which what was before black will be clear glass and what was before clear glass will be black. Hence the phonautographic lines are now transparent on an opaque black background. This negative forms what we term a "mother stencil".

To carry out the fifth step of the process a photo-engraver's cold rolled highly polished copper plate which has been coated with a sensitized film such as a very fine grained highly sensitive photographic film is disposed with its sensitized face in contact with the sensitized face of the "mother stencil" 17. Light then is passed through the photographic plate 17 or "mother stencil" and acts upon the sensitized film 19 of the copper plate 18 in the usual photographic manner. The film on the copper plate is a non-shrinkable film for obvious reasons. By contact with the "mother stencil" the record or phonautogram is photographically printed on the copper. The sensitized film 19 is then chemically treated and those portions between the phonautographic lines are washed out, exposing the copper surface. The photographic film on the copper is then dried slowly and baked at a high temperature. This baking is of great importance as will presently appear. The baking action causes the phonautographic line of film to become very hard and enamel-like in its texture. Between the lines, however, there is left more or less film which must be cleaned away by scrubbing. Now if the phonautographic film lines left on the plate are not baked, the washing to which the plate is now subjected would destroy or injure these lines to a considerable extent. After the plate is baked the plate is thoroughly scrubbed with salt and water, a brush being used for the purpose. This scrubbing cleanses the exposed copper between the phonautographic lines but because of the hardness of these phonautographic lines the scrubbing does not affect these lines.

The eighth step in the method is to etch the copper plate. The back of the copper plate is of course coated with a material impermeable to the etching fluid, and the copper plate which has been baked and scrubbed as at c in Figure 11ª is disposed in an etching bath and very carefully manipulated. This in the ordinary and usual manner etches away the ground between the lines of the phonautogram as shown in Figure 12 so that the phonautographic line is now raised above the level of the copper ground. The etching is carried on until the general surface of the copper has sunk about .00075 of an inch and then the plate is removed from the etching bath and washed and the plate is then warmed and submitted to a bath of cyanide which softens the enamel phonautographic line 19ª and permits the enamel to be stripped from the plate. This enamel comes off the plate in a long thin thread which is easily detached, and the removal of the enamel leaves a fresh unoxidized surface upon the raised record line or phonautogram 20 on the plate. The plate is then put in an etching bath and given a very slight etching which rounds off the corners of the projecting rib or phonautogram, as illustrated in Figure 13.

It is to be understood that the rib, or inverted groove, is only about .002" wide or about one-half the thickness of an ordinary hair and that only a very slight re-etching is necessary to eat away the corners of the rectangular rib so as to turn the rectangle into a semi-circle and it is plain that exposing a sharp corner of metal to the action of a mordant will round it slightly as the action being in all directions would meet after cutting through the corner and cause a lack of sharpness. This is assisted in our process by the fact that as soon as action takes place between the copper and mordant, a scum is formed which reduces the speed of the action materially and this is utilized by imparting a rocking motion to the tray containing the etching fluid, which washes the corners clean and causes them to etch faster. Furthermore this scum is in the form of a precipitate, which does not settle as readily on the edges and extreme corners as it does on the faces of the ribs and, furthermore, the action is assisted by brushing the plate with a fine brush while etching, thus keeping the corners clean and causing them to etch faster. That the corners do become rounded off is a fact which is easily proven in actual practice.

The copper plate is now ready for backing, if necessary, but if the plate is of thick enough material it may be used directly as a die without this backing. Whether backed or not the dies produced by the above named process are used in turn to produce phonographic records and record tablets of the usual character and by the usual process, as by impressing the die in the record tablet. Particular value, however, resides in the capability of using by our process cold rolled copper plate. Cold rolled copper plate is four times as hard as electro-deposited copper, and therefore not only may it be used without the necessity of backing but should last four times as long as the ordinary electro-deposited copper matrix. This copper, after it has been formed with the sound record thereon and used as a die, may be treated so as to remove the record from the face of the copper and the copper used over again, and this is due to the thickness and strength of the copper. It has not been possible to do this with electro-deposited copper. While we have referred to copper as being preferable material, we wish it understood that we might use case-hardened steel, zinc, silver, or other metallic sheets, probably, the best results, however, being secured from the copper of the character before described or from case-hardened steel.

It will be noted that the raised rib, as it may be termed, or inverse record on the copper plate, is an exact inverse duplicate of the record traced upon the plate 10 except that the ribs are narrower than the lines traced upon the plate 10 and of course have a height many times greater than the thickness of the film on the plate 10. The height of this inverse record upon the copper plate is approximately .001 of an inch or even less, and is preferably not greater than .00025 and the width of this rib or inverse record or line may be as narrow as .001 of an inch or as wide as .0025. The width of the line or rib formed upon the copper depends of course upon the width of the line cut through the film on the plate 10 and this width may also be regulated by controlling the time of exposure of the first positive to the action of the light passing through the master record 10, as illustrated in Figure 5. In a relatively short exposure the photographic line formed upon the positive will be equal to the distance between the inner edges of the margins 12, but with a longer exposure this line will widen somewhat by reason of the light passing not only perpendicularly to the surface of the plate but at an angle equal to the angle of the edge face of said margin 11ª. It is thus possible to regulate the width of the line formed upon the first positive 13 by regulating the time of exposure of this positive to the action of the negative formed by the master record.

This widening of the line, by a relatively longer exposure, is due to the fact that the sensitive film, being of a certain thickness, receives the direct light at first, but upon a longer exposure, the secondary or longer rays from all angles have time to print through the sensitive film at an angle, thereby increasing the width of the line. This is proven by the fact that increasing the thickness of a sensitive film increases a variation in the width of the line.

Preferably with all stages of our process, as for instances, when the record is photographically printed upon the first positive and photographically printed by the first positive upon a "mother stencil" and by this "mother stencil" upon the copper plate, the ray filters previously described are used. These ray filters cut out the ultra-violet rays and very greatly increase the definition under all circumstances so that the photographic line which corresponds to the phonographic record is extremely clean-cut. By the use of these films also the photographic line illustrated in Figure 6 as formed upon the first positive is extremely dense and the same is true of the photographically opaque background formed upon the "mother stencil" as illustrated in Figure 8. The sensitive plates may be submitted to and photographically printed through ray filters either by direct sunlight or the use of a flaming arc, the latter being preferable as having a uniform intensity and being capable of use at all times.

It will be obvious that a phonographic record cut in an infinitesimally thin structureless film disposed upon a surface having a highly polished and vitreous character is of necessity much more accurate and delicate than is possible where a phonographic record is cut in wax. In wax it is necessary in the first place that the groove shall be relatively deep for if it is not deep the recording stylus or cutter will not track properly. It will rise to the surface of the wax, particularly where the sound vibrations are of extreme range and will slip. This necessitates that the cutter shall dig relatively deeply into the wax and this of course causes great resistance to the vibrations of the recording stylus. The free vibrations of the diaphragm therefore are more or less checked or dampened by the impediment offered by the wax and the finer and more delicate tones and the "partials" will not be accurately or sufficiently recorded. Furthermore, in cutting a phonographic record in wax, the stylus cannot be disposed at an acute angle to the surface of the tablet as in this case the recording stylus will plow in or dig into the wax and there will be a constant variation in depth. The resistance offered by the wax to the movement of the stylus increases as the square of the depth of the cut so that it is obvious that this plowing in or digging in of the point of the stylus not only causes variations in depth but must also cause variations in the impediment offered by the wax to the lateral oscillations of the stylus and therefore the deeper the cut the less will the minor and finer irregularities be recorded. With our process, however, this is not the case. The stylus cannot dig in because it rests upon the polished surface of the glass sheet 10, and inasmuch as the film is of extreme thinness there is practically no resistance offered to the free vibrations of the stylus.

In cutting in wax, because a cutter arranged at an acute angle to the surface of the wax would inevitably dig in, the recording stylus is arranged approximately vertically and hence the point of the recording stylus moves in a vertical arc. By cutting the record through a film on a glass plate, however, the recording stylus may be arranged at an acute angle, and by placing it at an acute angle, as illustrated in Figure 1ª, the extremity of the recording stylus while moving in an arc, does not move in an entirely vertical arc and hence the stylus does not rise from the glass plate at the end of its stroke to any such extent as it would do if the needle were vertical. We thus secure, by using the glass plate 10 and the thin film thereon and by arranging the stylus at an acute angle to cut through this film, a record which is of absolutely even width no matter how great the swing of the stylus may be, that is, no matter how great the amplitude of vibrations of the diaphragm, and we obviate all the deterent factors present where wax is used as a recording medium. Further than this, the use of our method does away entirely with all the expense incident to the wax plant of manufacturers turning out commercial records. The room taken up by the wax plant is very large and the wax must be prepared by skilled workmen. Furthermore, the wax can only be used at certain temperatures, or at least the density of the wax, and its resistance to the action of the recording stylus, will differ with differences in temperatures. A wax tablet brought from one room to another will change its density almost immediately with changes in temperature. As a consequence, where wax is used as a recording medium it is necessary that every possible care be taken to keep the wax at a certain definite temperature and this is practically impossible. Even as the phonautogram is being traced upon the wax tablet the wax will change its density and will be much harder toward the latter end of the recording operation than it was toward the beginning.

In the actual commercial recording or making of a record, a dozen or more attempts will be made to secure the record. Some of these attempts will be rank failures, others will be partial failures, and possibly one out of the dozen will come up to a certain standard and may be used for the production of the "dubs" from which the dies are eventually formed. This means expense, loss of time, and an extreme care and great waste. As a matter of practical experience, not of theory, it is possible with our method to secure a perfect record without the necessity of any experiments whatever and with the certainty that the records so made will be absolutely accurate and may be immediately used for the production of "mother stencils" from which the dies may be made by the process heretofore described. It is obvious that this fact alone very greatly reduces the expense and annoyance incident to making a record and that the elimination of this expense or the expense of the wax plant with all its attendant difficulties or problems very greatly reduces the cost of making records both as regards overhead charges and actual charges incident to making any one record.

Again, where the record is made in wax, if it is attempted to increase the number of record lines or grooves to an inch, the wall of wax between any two record grooves becomes so thin that it breaks down so that the record is of no value. In view of this fact and after much careful experiments to increase the number of the record lines or grooves to the inch, the manufacturers who make the standard commercial records of to-day, after trying to secure from one-hundred to one-hundred and sixteen grooves or lines to the inch, have at last decided to use the standard number of ninety-six grooves to the inch. Now with the method heretofore described, we have actually turned out perfect records having from one-hundred and fifty to three-hundred record lines or grooves to the inch, and this without any particularly delicate manipulation and with less delicate manipulation than is necessary where the record groove is cut in wax. Furthermore it is pointed out that the elimination of the electroplating plant which is necessary in the formation of records according to the processes most in favor today, eliminates a very large item of expense and very greatly increases the speed with which the complete records may be made inasmuch as the electro-plating process takes a relatively long time. Furthermore, the matrices so made, as before stated, are weak and have to be backed, which is not the case with the matrices or dies formed by our method.

Again, in cutting a record in wax, the bottom of the cut is and must be the actual sound record for reasons which are perfectly obvious. It is the point or extremity of the recording stylus which does the cutting and which moves in accordance with the sound vibrations and therefore it follows that all of that portion of the relatively deep cut or groove formed in the wax above this bottom is waste and unnecessary. This groove is approximately V-shaped in cross section today so as to permit free lateral vibration of the needle. This, however, widens the record groove upon the surface of the record to such an extent that only slightly more than one-hundred record grooves to the inch can be formed upon the record.

In Figures 15 and 16 we show a record 21 formed with a record groove 22 therein, this record groove being impressed in the plate 20 by means of the die formed by the raised record line or phonautogram 20 on the copper plate. It will be noted from Figures 15 and 16 that this groove 22 is a segment of a true cylinder. In Figure 16 is shown a reproducing stylus 23. This figure shows the extremity of the ordinary steel reproducing needle commonly used with commercial types of gramophones and this extremity is laterally rounded so as to be approximately hemispherical. The groove 22 is struck on a circle having the same diameter as the diameter of the hemispherical extremity of the needle 23. The depth of the groove is less, however, than the radius of the circle upon which the groove is struck and hence the needle or reproducing stylus has free lateral vibration within the record groove. This is fully brought out and illustrated in the co-pending application for patent upon a phonographic record heretofore referred to. The groove 22 is relatively shallow and relatively narrow, and it is obvious that the shallower the groove the less its width. We have found by actual experience that this shallow laterally rounded groove will grip the rounded extremity of the reproducing stylus perfectly and cause this stylus to track perfectly. Furthermore, it is pointed out that this groove has a uniform width and that every portion of the surface of the groove is a correct reproduction of the sound vibration. As before stated, in the ordinary V-shaped record groove cut in wax it is only the bottom of the groove which forms a true record. Inasmuch as our groove is not formed by originally cutting it in wax but by a totally different process, it is obvious that the groove at any point of its surface corresponds truly to the sound vibrations and that the reproducing needle or stylus will rotate within this groove in the same manner that a ball will rotate within the socket of a ball and socket joint. As a consequence of this, the stylus is positively oscillated and the diaphragm is positively oscillated. Furthermore, in recording in wax, one wall or the other of the groove receives more decided or deeper cut impressions, if the recording needle or stylus is not disposed exactly on a diametrical line extending through the record, and intersecting at right angles the line extending from the pivotal axis of the record arm. Which wall receives more decided or deeper cut impressions depends upon whether the recording needle is moving from the outer edge of the record toward the middle thereof or moving from the middle toward the center of the record, and this fault is reproduced in the final record tablet so that in reproducing commercial records the reproducing stylus engages with only one side of the wall and hence gives a positive movement to the diaphragm in only one direction, the reverse movement of the diaphragm being secured by the resilience thereof. With our record groove the diaphragm is moved positively at all times and for this reason we secure a clearness not possible in reproducing the records, with entire lack of the distinctive phonographic tone or nasal tone which is present in the ordinary reproduction of commercial records.

Attention is also called to the fact, as illustrated in Figure 12, that the copper plate is etched to a depth not greater than the width of the ribs forming the record, and that when the copper plate has been given its last slight etching to round off the corners of these ribs there is produced a record rib which has the form of a segment of a cylinder, this segment being not greater than one-half the cylinder. This is of particular importance in view of the fact that the record groove which is formed by impressing the copper die upon a suitable record tablet thus fits the curvature of the extremity of the reproducing needle so as to secure the ball and socket joint heretofore described. If the depth of the record groove were greater than the diameter of the circle upon which the arc of the groove is struck the stylus could not fit within the groove and oscillate laterally.

While, as before stated, it is possible to use the master record shown in Figure 1 as a photographic negative for the reproduction of a photographic positive on the metallic plate which is to form the die or matrix, yet for various reasons it is preferable to make the photographic positive illustrated in Figure 6 and the photographic negative or "mother stencil" illustrated in Figure 8. The reason for this is that the master record is made on relatively thick glass. This glass is expensive and to store away this glass would be wasting space and a waste of money. The first positive, however, and the "mother stencil" are made on relatively thin glass. The first positive is used to make a "mother stencil" and is then stored away, or it may be used to make a number of "mother stencils." It is placed in the storeroom of a manufacturer and may be used at any time for making other "mother stencils" without any damage to the plate. A large number of "mother stencils" can be made and from each of the "mother stencils" a large number of photographs may be made upon the matrices or copper plates. Then the "mother stencil" may be readily stored away and if it be desired to produce more matrices it is an easy matter to produce them from these "mother stencils" without the necessity of using the first positive which is disposed in the records of the company. It will be seen that this obviates the necessity of any fragile master record on wax and eliminates also all danger of the record being damaged by stripping an electroplated matrix from the master record and also does away with the necessity of forming "dubs."

By the use of our method a very great economy of time is secured. Whereas to-day it is practically impossible to produce any matrices or dies within one month of the time that the sound record is first made upon the master tablet, with this invention the possibility has been demonstrated of making dies capable of use within four hours after the original record has been made upon the plate 10, and it is entirely practical to turn out absolutely perfect commercial dies in large numbers fit for immediate use within twenty-four hours after the original record has been made. Now it is obvious that manufacturers desire to record certain pieces and get them upon the market as soon as possible before the popularity of the piece wanes. Under the present methods it is not possible to do this for the reasons above stated. It is possible to do this with our method, as has been proved by actual demonstration. Furthermore, we do away with all expense incident to the wax plant and to the electro-plating plant, which expense is very great, and we eliminate all the annoyance and difficulty experienced in recording sound vibrations upon wax tablets where a perfect record can only be secured after repeated and vexatious trials.

Attention was particularly called to that step in our process which consists in baking the photographically unaffected portions of the film left on the copper plate after the photographically affected portions of the film have been washed away. Without this baking of the film record, as it may be termed, it would be impossible to entirely cleanse the surface of the copper by scrubbing. After this film has been baked as described, the plate is scrubbed with salt and water. It is not scrubbed lightly but sufficiently hard so as to clear entirely away any bit of the film which may remain between the lines unaffecting the washing away of the photographically affected portions of the film. This brightens that portion of the copper, cleanses it entirely and puts it in proper shape for etching. The baking of the film renders the raised film lines of an enamel-like texture which entirely resists this scrubbing action. Now after the plate has received its first etching whereby the spaces between the lines are etched, this film is stripped off and this leaves the surface of the raised lines or ribs fresh and unoxidized and therefore capable of being etched very readily. As a consequence a very slight submersion in the etching bath will remove the corners of the ribs and cause these corners to be rounded off in the manner described, which would not be the case if the film line did not absolutely protect the face of the rib from the action of the acid.

We are aware of the patent granted to Berliner No. 564,586 on July 28, 1896, in which it is proposed to trace a record through a thin layer of ink formed of oil and lamp black and deposited on a glass plate and then use this plate for the purpose of photographically engraving sound records upon a metallic plate. We also are aware of the fact that it has been proposed to use lamp black alone as the medium through which the phonautogram is to be traced.

While the broad idea of our invention is to a certain extent disclosed in this patent to Berliner, yet the details of our method of making sound records, which details make the method a success, are not disclosed or anticipated in this patent.

In the first place it is not possible to secure by the means disclosed a thoroughly homogeneous and structureless coating or layer through which the phonautogram can be traced. The lamp black is in the form of a more or less impalpable powder but when a tracing is made through this powder the little particles of the lamp black are not cut through and the cut or tracing is not as a consequence clean but on the other hand is fuzzy at the side edges of the phonautogram. It will be seen that we provide, not an "ink" or any composition containing lamp black, but a film of extreme tenuity which is perfectly structureless, which film may be dried and yet retain its coherence, which film can be cut without clipping or without dragging the material so that a clean line may be cut through the film and to the glass itself. Furthermore, it is pointed out that this thin film is cut and not traced through.

Again referring to the fact that the Berliner patent uses an ink composed of oil and lamp black, it is pointed out that it is impossible to cause this layer of ink to dry sufficiently within a short time to permit it to be laid face down on the sensitized face of a photographic plate or sensitized face of a copper plate and not deform the line by the compression of the relatively soft material and not so soil the face of the sensitized plate as to largely prevent the proper photographic action of light thereon. If, however, the ink face of the plate is not disposed in contact with the sensitized surface of the glass, then the thickness of the glass between said phonautogram and the sensitized plate will prevent any accurate printing of the negative upon the copper or upon a positive. If, on the other hand, this ink is allowed to dry until it will not smear or compress, then when the oil is evaporated from the ink it loses its attachment to the glass, the particles of the lamp black will shift upon each other and the mere contact of the lamp black film with the surface of a sensitized plate will cause the deformation of the photographic lines by particles of lamp black being shifted into or across these traced lines, and here again there is a liability of the lamp black being transferred to the surface of the sensitized film and affecting the subsequent chemical action on the film. It is of course obvious that Berliner does not suggest in this patent the use of ray filters, and thus even assuming that a proper phonautograph was made upon the inked plate so that this inked plate could be used as a negative for the production of a positive upon the copper plate, yet this positive would not be clear and distinct, particularly where the stylus vibrated through a relatively great range of oscillation or angular movement for the reasons heretofore stated in this specification. The stylus would lift under these circumstances at the ends of its stroke, leaving a slightly beveled margin which would not be absolutely opaque to light. Furthermore, the patent to Berliner merely refers to the use of a photoengraving process for the production of dies immediately from the master record. The master record might be used once or twice with possibly no damage to the master record, but it could not be used for the production of any amount of dies and "dubbing" would have to be resorted to in order to increase the number of dies. This is avoided in our process by the use of the first positive and the "mother stencil" whereby the master record is used only a very few times, if more than once.

It is thought best to give the following résumé of the steps constituting our process. The steps are as follows: First: Flowing a photographically opaque film on glass. Second: Cutting a record line upon this plate and through the film. Third: Placing the film face to face with a sensitized plate and by the use of color screens photographically forming a black line positive. Fourth: Placing this positive with its face against the sensitized face of a photographic plate to form a "mother stencil" or second negative, using color screens as before. Fifth: Placing the "mother stencil" against the sensitized surface of the metal plate and exposing it to light to render the lines forming the record insoluble. Sixth: Washing away the photographically affected portions of the film. Seventh: Baking those portions of the film remaining on the plate to thereby form an enamel-like thread upon the plate conforming in its outlines to the phonautogram. Eight: Scrubbing the copper to remove all traces of the film between the lines and to thereby clean the surface of the copper and make it ready for etching. Ninth: Etching the copper to a depth not greater than the width of the ribs covered by the enamel-like thread. Tenth: Removing the thread of enamel-like material to thereby leave the surface of the ribs bare and clean. Eleventh: Slightly re-etching the plate to round off the corners of the record ribs so made. Twelfth: Using the plate so etched as a die for the production of a commercial phonographic record.

Having described the invention, what we claim is:

1. The method of making dies for the production of sound record tablets consisting in photo-engraving a metal plate to form a laterally undulatory rib thereon in correspondence with sound vibrations and then rounding off the corners of the rib.

2. The method of producing a die for forming sound record tablets which consists in first recording sound waves on a metallic plate, removing portions of the plate to define the lines of record in the form of ribs, and then rounding off the corners of said ribs.

3. The method of making dies for the production of sound record tablets which consists in first recording the sound waves on a suitable metallic plate, removing portions of the plate to define the lines of record as raised ribs, and then submitting the plate to an etching bath to remove the corners of said ribs.

4. The method of making dies for the production of sound record tablets which consists in photographing a sound record upon a metallic plate having thereon a photographically sensitized film, removing the photographically unaffected portions of the film to thereby define record lines, etching the plate to thereby produce laterally undulatory ribs corresponding in form to sound vibrations, the plate being etched to a depth not greater than the width of said ribs, removing the film on the faces of the ribs, and then rounding off the faces of the ribs.

5. The method of making dies for the production of sound record tablets which consists in photographing a sound record upon a metallic plate having thereon a photographically sensitized film, removing the photographically unaffected portions of the film to thereby define record lines, etching the plate to thereby produce laterally undulatory ribs corresponding in form to sound vibrations, the plate being etched to a depth not greater than the width of said ribs, then removing the film on the faces of the ribs, and then submitting the plate to a second etching to remove the corners of the ribs.

6. The method of making dies for the production of sound record tablets which consists in first photographically recording the sound waves on a suitable plate having on its face a film of photographically sensitized material, removing the photographically unaffected portions of the film to thereby define laterally undulatory record lines, etching the plate to thereby produce laterally undulatory ribs corresponding in form to the sound vibrations, then removing the portions of the film adhering to the faces of the record ribs and submitting the plate to a second etching to remove the corners of said ribs.

7. The method of making dies for the production of phonographic records which consists in first photographically recording the sound waves on a metallic plate having thereon a sensitized film, removing the photographically unaffected portions of the film to thereby define record lines, baking the film to render the record lines of film of an enamel-like character, etching the plate to produce laterally undulatory record ribs corresponding to sound vibrations, removing the baked film from the faces of the record ribs, and then subjecting the plate to a second etching.

8. The method of making dies for the production of phonographic record tablets which consists in first photographically recording the sound waves on a metallic plate having thereon a film of photographically sensitive material, removing the photographically unaffected portions of the film to produce record lines, etching out the portions of the plate between the lines of record to thereby produce upstanding ribs corresponding in form to sound vibrations, baking the film on the faces of said ribs, scrubbing and cleaning the surface of the plate between said baked record lines, etching the plate to a depth not greater than the width of the ribs, removing the baked film from the faces of the record ribs, and subjecting the plate to a second etching to thereby round the corners of the ribs.

9. The method of making dies for the production of phonographic record tablets which consists in photographing a sound record upon a plate having a sensitized film thereon, treating the plate to remove the photographically unaffected portions of the film to thereby define record lines of film on the plate, treating the plate to lower the surface of the plate between said lines, removing the film from the record ribs so formed and rounding said ribs.

10. The method of producing a master record which consists in cutting a laterally undulatory line by and in accordance with sound vibrations entirely through a film of homogeneous, hard, initially gelatinous material deposited upon a plate of glass, such film having such character that it becomes opaque to actinic rays when used with predetermined color screens through which the rays are passed.

11. The method of making phonautographic master records which consists in flowing a homogeneous semi-liquid material upon a glass base to thereby form an extremely thin film, drying the film to such degree that a phonautographic line may be cut therein without dragging or chipping the film and that the film will not spread laterally under compression, rotating the plate and simultaneously cutting a laterally undulatory phonautographic line through the film to the surface of the plate in accordance with the sound vibrations.

12. The method of making a die for producing phonographic sound record tablets which consists in cutting an undulatory line entirely through a film of homogeneous material disposed upon a plate of glass by and in accordance with sound vibrations, photographically transferring the phonautogram so made to a metallic plate having thereon a photographically sensitive film by and with the aid of ray filters which render the film photographically opaque, and subjecting the plate to the action of an etching agent whereby to remove portions of the plate to define the lines of record in the form of raised ribs.

13. The method of making a die for producing phonographic sound record tablets which consist in cutting an undulatory line entirely through a film of material disposed upon a plate of glass by and in accordance with sound vibrations, photographically transferring the phonautogram so made to a metallic plate having thereon a photographically sensitive film by and with the aid of ray filters which render the film photographically opaque, and subjecting the plate to the action of an etching agent whereby to remove portions of the plate to define the lines of record in the form of raised ribs, and rounding the corners of said ribs.

14. The method of producing photographic duplicates of a sound record which consists in forming a phonographic master record by cutting an undulatory line by and in accordance with sound vibrations entirely through a hard film of homogeneous opaque material deposited upon a plate of glass, using said master record as a phonographic negative by placing the master record with its film side against and in contact with the film side of a plate having thereon a photographically sensitive film surface, and then photographically treating said last named plate.

15. The method of producing phonographic duplicates of a sound record which consists in forming a phonographic master record by cutting an undulatory line by and in accordance with sound vibrations entirely through a film of hard, homogeneous material deposited upon a plate of glass using said master record as a negative by disposing the film side of said plate against and in contact with the film side of a plate having thereon a photographically sensitive film surface, photographically printing the negative upon said film surface of the plate, and then photographically treating said plate to provide a black line positive, and then using said black line positive to produce photographically a stencil plate having transparent lines corresponding to the black record lines of the positive.

16. The method of producing reproductions of sound records consisting in forming a master record by cutting a laterally undulatory line by and in accordance with sound vibrations entirely through a film of homogeneous, hard material deposited upon a plate of glass, photographically printing the phonautogram so made upon a transparent plate having a sensitized surface by and with the aid of ray filters which render the film photographically opaque and then photographically treating said plate to produce a positive having black lines corresponding to the phonautographic lines of the master record.

17. The method of producing reproductions of sound records consisting in forming a master record by cutting a laterally undulatory line by and in accordance with sound vibrations entirely through a film of hard and homogeneous material deposited upon a plate of glass, photographically printing the phonautogram so made by placing the film side of said glass plate against and in contact with the film side of a transparent plate having a sensitized film surface by and with the aid of ray filters which render said film photographically opaque, then photographically treating said plate to produce a positive having black lines corresponding to the phonautographic lines of the master record, using the positive so formed for photographically printing a reproduction of said positive upon a transparent plate having a sensitized surface to thereby produce a stencil or negative having white lines upon an opaque ground by and with the aid of ray filters, then using this stencil to photographically reproduce the sound record upon the surface of a sensitized metallic plate by and with the aid of ray filters which permit only photographically active light rays to pass, treating the plate to remove the photographically unaffected portions of the film to define record lines upon the plate, etching the plate to lower the surface of the material between said record lines and thereby leave record ribs, and then removing the film from the surface of the record ribs.

18. The method of producing reproductions of sound records consisting in forming a master record by cutting a laterally undulatory line by and in accordance with sound vibrations, entirely through a film of hard and homogeneous material, deposited upon a plate of glass, by and in accordance with said vibrations, photographically printing the phonautogram so made upon a transparent plate having a sensitized surface by and with the aid of ray filters, then photographically treating said plate to produce a positive having black lines corresponding to the phonautographic lines of the master record, using the positive so formed for photographically printing a reproduction of said positive upon a transparent plate having a sensitized surface to thereby produce a stencil or negative having white lines upon an opaque ground by and with the aid of ray filters, then using this stencil to photographically reproduce the sound record upon the surface of a sensitized metallic plate by and with the aid of ray filters, treating the plate to remove the photographically unaffected portions of the film to define record lines upon the plate, etching the plate to lower the surface of the material between said record lines and thereby leave record ribs, then removing the film from the surface of the record ribs, and subjecting the plate to an etching bath to round the corners of said ribs.

19. The method of producing dies for making phonographic record tablets consisting in producing a master record having a relatively hard and homogeneous film upon one face thereof, cutting a laterally undulatory phonautogram entirely through said film, disposing the film face of the plate against and in close contact with a photographically sensitized face of a transparent plate and photographing the phonautogram upon said sensitized face, using said positive thus made to produce a negative or stencil, and using the negative so made in a process of photo-engraving a metallic plate to thereby produce raised ribs upon said plate laterally undulatory in accordance with said phonautogram.

20. A method of making dies for forming phonographic record tablets which consists in photo-engraving a metallic plate to produce a phonautogram thereon having the form of a raised rib and then rounding the corners of the rib.

21. A method of making dies for forming phonographic record tablets which consists in photo-engraving a metallic plate to produce a phonautogram thereon having the form of a raised rib, and then slightly etching said plate to round off the corners.

22. The method of forming dies for producing phonographic record tablets which consists in photo-engraving a metallic plate to produce a phonautogram thereon having the form of a raised rib, the rib having a depth not greater than the width of the rib, and successively subjecting the plate to a slight etching to thereby round the corners of the rib.

23. The method of reproducing phonautograms, which consists in using a negative having a translucent relatively hard ground with a transparent phonautogram traced through said ground, and photographically imprinting an impression of the phonautogram upon a photographically sensitized surface by passing light through ray filters or screens, and through the negative, said ray filters being of such character that with the negative ground they prevent the passage of light having actinic activity.

24. The method of recording and reproducing phonautograms which consists in cutting a phonautogram through a tenuous film of hard translucent, homogeneous material disposed upon and in contact with the vitreous face of a plate of transparent material, said film being tinted of substantially an orange color to thereby provide a negative having a yellowish orange colored ground with a transparent phonautogram thereon and photographically printing an impression of the phonautogram upon a photographically sensitized surface by passing light through ray filters or screens of such character as to render the light passing through the ray screens and the film of a ruby color.

In testimony whereof we affix our signatures in the presence of two witnesses.

EARLE W. JONES.
EDWARD R. HARRIS.

Witnesses:
  FREDERIC B. WRIGHT,
  EUGENE C. SMITH.